(No Model.)
E. J. HOFFMAN.
DEVICE FOR PREVENTING INCRUSTATION.
No. 270,569. Patented Jan. 9, 1883.
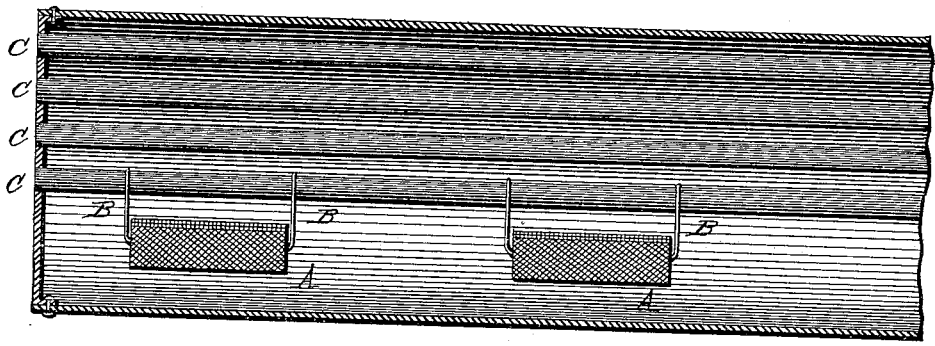
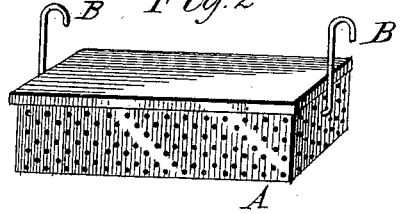
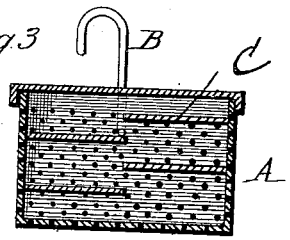

UNITED STATES PATENT OFFICE.

EDWARD J. HOFFMAN, OF SIOUX CITY, IOWA, ASSIGNOR OF ONE-HALF TO DAVID P. MAGNER AND PATRICK J. MAGNER, BOTH OF SAME PLACE.

DEVICE FOR PREVENTING INCRUSTATION.

SPECIFICATION forming part of Letters Patent No. 270,569, dated January 9, 1883.

Application filed November 13, 1882. (No model.)

*To all whom it may concern:*

Be it known that I, EDWARD J. HOFFMAN, of Sioux City, in the county of Woodbury and State of Iowa, have invented certain new and useful Improvements in Devices for Preventing Incrustation of Boilers; and I do hereby declare that the following is a full, clear, and exact description of the invention, which will enable others skilled in the art to which it appertains to make and use the same, reference being had to the accompanying drawings, which form a part of this specification, and in which—

Figure 1 is a sectional view of a part of a steam-boiler provided with my device, and Figs. 2 and 3 are detail views.

Similar letters of reference indicate corresponding parts in all the figures.

My invention has relation to devices for preventing incrustation of steam-boilers; and it consists in the detailed construction of a basket or receptacle adapted to be suspended from the flues of the boiler.

It is well known that many substances will prevent incrustation of boilers, such as sawdust, bark, pitch, and many other substances; and to form a receptacle for such substances I make baskets A, of wire-cloth or perforated zinc, suspended by hooks B, of copper wire, from the flues C. These baskets are rectangular or of any desired shape, having sides and bottom perforated, and provided with a cover or lid if they are intended to contain light substances—such as sawdust or bark—which are easily washed away by the agitation of the boiling water. By means of the hooks B the baskets may be suspended from the flues in the boiler at different places in the boiler, so as to bring all the water contained in the boiler in contact with the substance contained in the basket.

To enable the water in the boiler to come in contact with as much of the substance as possible, the basket may be provided with shelves C, such as shown in cross-section in Fig. 3 of the drawings, fastened alternately to opposite sides of the basket, and extending with their free ends into the spaces between the shelves upon the opposite side. In this manner the water passes over and around the substance which prevents the incrustation, and is subjected to its influence, whether it be in absorbing what it contains or in depositing the lime or salt it contains.

I am aware that substances preventing incrustation have been placed in wire baskets deposited in the bottoms of steam-boilers; but in this manner all the water in the boiler does not come in contact with the substance in the basket, which I effect by suspending the baskets, and I do not claim that, broadly; but What I do claim, and desire to secure by Letters Patent, is—

The basket A, of wire cloth or perforated sheet metal, having shelves C fastened alternately to opposite sides of the basket, and hooks B B at both ends, adapted to contain substances preventing incrustation in boilers, and to be suspended at different places in them from the flues by means of the hooks, substantially as and for the purpose shown and set forth.

In testimony that I claim the foregoing as my own I have hereunto affixed my signature in presence of two witnesses.

EDWARD J. HOFFMAN.

Witnesses:
M. B. DAVIS,
H. J. HARRINGTON.